(12) United States Patent
Gong et al.

(10) Patent No.: US 9,709,086 B2
(45) Date of Patent: Jul. 18, 2017

(54) SELF-DRILLING, SELF-CLEANING PANEL FASTENER

(71) Applicant: Illinois Tool Works Inc., Glenview, IL (US)

(72) Inventors: Yongping Gong, Wilmette, IL (US); Daniel A. Sherrer, Powell, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 12 days.

(21) Appl. No.: 14/832,323

(22) Filed: Aug. 21, 2015

(65) Prior Publication Data

US 2016/0061247 A1 Mar. 3, 2016

Related U.S. Application Data

(60) Provisional application No. 62/041,737, filed on Aug. 26, 2014.

(51) Int. Cl.
*F16B 25/10* (2006.01)
*F16B 25/00* (2006.01)

(52) U.S. Cl.
CPC ........ *F16B 25/103* (2013.01); *F16B 25/0021* (2013.01); *F16B 25/0031* (2013.01); *F16B 25/0057* (2013.01); *F16B 25/0094* (2013.01)

(58) Field of Classification Search
CPC .............. F16B 25/0021; F16B 25/0031; F16B 25/0057; F16B 25/0094; F16B 25/10; F16B 25/103; F16B 33/02; F16B 2033/025; F16B 35/04; F16B 35/041
USPC ............................ 411/387.2, 387.6, 411, 424
See application file for complete search history.

(56) References Cited

U.S. PATENT DOCUMENTS

| 470,804 | A | * | 3/1892 | Jones | ...................... F16B 4/004 411/424 |
| 471,179 | A | * | 3/1892 | Jones | ...................... F16B 4/004 411/424 |
| 3,739,682 | A | * | 6/1973 | Siebol | ................. F16B 25/0031 408/224 |

(Continued)

FOREIGN PATENT DOCUMENTS

EP 1990551 A2 11/2008

OTHER PUBLICATIONS

International Search Report and Written Opinion of the International Searching Authority in PCT/US2015/046455 dated Oct. 30, 2015.

*Primary Examiner* — Roberta Delisle
(74) *Attorney, Agent, or Firm* — Levenfield Pearlstein, LLC

(57) ABSTRACT

A self-drilling, self-cleaning fastener for a panel includes a head having a top side and an underside. The head has a diameter. A shank depends from an underside of the head and has a diameter less than the diameter of the head. A knurled region is adjacent the shank. The knurled region has a diameter and a plurality of spiral formed knurls having a twist in a first direction. The knurls define a major circumference as measured around peaks of the knurls. A threaded region is adjacent the knurled region and has a diameter less than the diameter of the knurled region. The threaded region has a thread form having a twist in a second direction opposite the first direction. A driving point is at an end opposite the head.

8 Claims, 1 Drawing Sheet

(56) References Cited

U.S. PATENT DOCUMENTS

| | | | | |
|---|---|---|---|---|
| 3,827,331 A | * | 8/1974 | Muenchinger | F16B 25/0021 411/387.4 |
| 4,621,963 A | * | 11/1986 | Reinwall | F16B 5/0275 411/369 |
| 4,816,346 A | | 3/1989 | Hulsey | |
| 5,295,774 A | * | 3/1994 | Roberts | B21H 3/027 411/387.2 |
| 5,516,248 A | * | 5/1996 | DeHaitre | F16B 23/0015 411/387.2 |
| 6,109,850 A | * | 8/2000 | Commins | F16B 25/0031 411/387.2 |
| 6,616,391 B1 | | 9/2003 | Druschel | |
| 7,832,173 B2 | * | 11/2010 | Crawford | E04C 3/16 411/387.1 |
| 8,430,618 B2 | * | 4/2013 | Baer | F16B 35/041 411/386 |
| 9,377,045 B2 | * | 6/2016 | Su | F16B 25/103 |
| 2007/0237606 A1 | * | 10/2007 | Takasaki | F16B 25/0015 411/387.2 |
| 2007/0269287 A1 | * | 11/2007 | Runge | F16B 25/00 411/378 |
| 2009/0185880 A1 | * | 7/2009 | Gong | F16B 25/0031 411/387.4 |
| 2012/0294693 A1 | | 11/2012 | Gonciarz et al. | |
| 2013/0011214 A1 | * | 1/2013 | Lin | F16B 25/0015 411/387.4 |

* cited by examiner

SELF-DRILLING, SELF-CLEANING PANEL FASTENER

CROSS-REFERENCE TO RELATED APPLICATION DATA

This application claims the benefit of and priority to Provisional U.S. Patent Application Ser. No. 62/041,737, filed Aug. 26, 2014, the disclosure of which is incorporated herein in its entirety.

BACKGROUND

Insulated metal panels (IMPs) are often used as roofing panels, wall panels and the like. In an IMP has thin gauge metal panels with a layer of insulation between the metal panels. The insulation layer is typically about two to six inches in thickness, but can be of any thickness.

In a typical roofing IMP installation, the panel (which is prefabricated), is laid on the underlying structure, for example, the steel deck of a roof. A membrane may be positioned over the panel and self-drilling screws are then driven through the membrane, the top panel, insulation and bottom metal panel into to the underlying substrate. Alternately, a washer, such as a resilient (e.g., rubber) washer is placed on the fastener or outer surface of the panel, and the fastener is driven through the washer and the panel and into the substrate. The membrane or washer provide a weather resistant seal between the fastener and the panel.

One drawback to the use of such fasteners is that metal debris or shavings from the IMP can be generated that can have a negative impact on the integrity of the membrane or washer. That is, as the threads penetrate the outer panel, insulation, inner panel and substrate, debris, such as shavings or cuttings can be pulled up by the threads as the fastener is driven into the panel. The debris, some of which is metal shavings, can become lodged between the head of the fastener and the membrane or washer. Because the nature of the shavings is such that there are sharp edges and points, the shavings can cut or puncture the membrane or washer, thus compromising the integrity of the membrane or washer and impacting the ability to maintain weather resistance.

Another drawback to the use of such fasteners is that the fastener thread may pull up the top panel when the point penetrates the substrate. This can detach the top panel from the insulation layer. Moreover, such fasteners can be easily over-driven, thus reducing the IMP thickness and impacting the insulating ability of the IMP.

Accordingly there is a need for an improved fastener that is self-drilling and self-cleaning. Desirably, such a fastener reduces the likelihood of damage to the panel and to any weather-resistant member associated with the panel, during installation. Desirably, such a fastener securely fastens an IMP to a secondary structure and does not compromise the integrity or efficiency of the panel.

SUMMARY

A self-drilling, self-cleaning fastener has a head having a top side and an underside. The head has a diameter. A shank depends from an underside of the head and has a diameter less than the diameter of the head.

A knurled region is adjacent the shank. The knurled region has a diameter and a plurality of spiral formed knurls therein having a twist in a first direction. The knurled region defines a major circumference as measured around peaks of the knurls.

A threaded region is adjacent the knurled region and has a diameter less than the diameter of the knurled region. The threaded region has a thread formed therein having a twist in a second direction opposite the first direction. A driving point is at an end opposite the head.

As the fastener is driven into a panel, it penetrates the panel and is driven into an underlying substrate. The opposite-hand twist of the knurls (opposite of the driving direction) drives metal shavings from the outer or inner panels downward, into the panel and toward the inner surface and substrate, thus reducing the potential for metal shavings to exit through and out the outer panel surface.

In an embodiment, the threaded region has a right-hand twist and the knurled region has a left-hand twist. The fastener can includes a transition between the threaded region and the knurled region that defines a step.

One embodiment of the fastener includes 6 knurls equally spaced about a periphery of the fastener to define a major diameter across peaks of opposing knurls. The driving point can be, for example, a self-drilling point. The fastener can be formed as a bi-metal fastener in which, for example, the first portion material is a hardened material, such as a heat-treated or heat-hardened carbon steel and the second portion material is a corrosion resistant material, such as a stainless steel. The first portion can be formed from the driving point to a location along the threads and the second portion can be formed from an end of the first portion to the head. The fastener can include a coating to provide corrosion resistance and or ease of driving.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION

Figure 1:
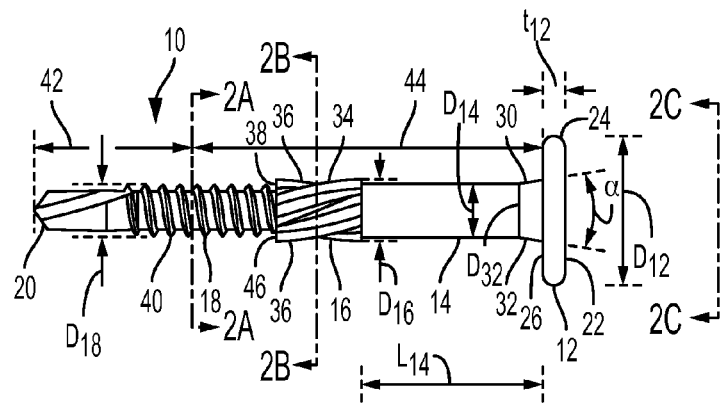
FIG. 1 is a side view of one embodiment of the self-drilling, self-cleaning insulated panel fastener.
Figure 2A:
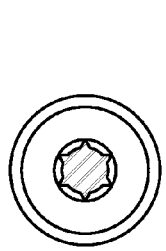
FIGS. 2A-2C are views of the fastener taken along lines 2A-2A, 2B-2B, and 2C-2C, of FIG. 1.
Figure 2B:
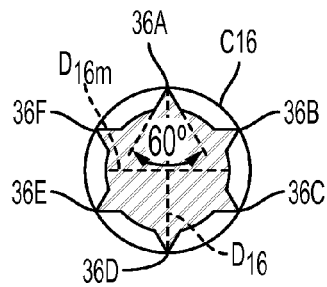
Figure 2C:
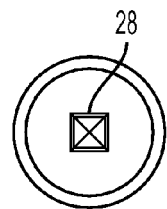

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring to the figures and in particular to FIG. 1, there is shown an embodiment of the self-drilling, self-cleaning insulted panel fastener 10. The fastener 10 includes generally, a drive head 12, a shank 14, a knurled region 16, threads 18 and a driving tip or point 20.

The head 12, which in an embodiment, has a generally flat top side 22 and a rounded edge 24, defines an underside 26. The head 12 has a drive recess 28 to accept a drive bit, such as the illustrated a square opening for a square drive, a Phillips-style driving bit, a hexagon drive bit or the like. Alternatively, the drive head can be formed with an angled formation extending upwardly from the top surface, such as a hex bolt profile or can be formed with any other known drive configuration. The drive portion is positioned on the top side of the head.

A portion 30 of the fastener 10 between the head 12 and the shank 14 can be formed having an angled or tapered transition 32. In an embodiment, the transition 32 has a taper angle α of about 15 degrees.

The shank 14 is formed depending from the head 12 or the transition 32. The shank 14 is formed as an elongated cylindrical element. As illustrated, the shank 14 can be formed as a smooth cylinder or, alternatively, the shank can be formed with threads (not shown). The shank 14 has a diameter $D_{14}$.

The knurled region 16 is adjacent the shank 14. The knurled region 16, as will be described below, has a spiral formation 34 that spirals in a direction. In the illustrated fastener 10, the knurled region 16 has a left-hand spiral formation 34. The knurls 36 define a circumference $C_{16}$ as measured around the peaks or the knurls 36. In an embodiment, the knurled region 16 is formed with six symmetrical knurls 36A-36F, equally spaced from one another and as such, defines a major diameter $D_{16}$ as measured across the peaks of opposing knurls, e.g., 36A and 36C. Other knurl formations will be recognized by those skilled in the art.

Self-tapping threads 18 are adjacent to the knurled region 16. The self-tapping threads 18 are of a known self-tapping thread form and extend from an end of the knurled region as indicated at 38 toward the self-tapping point 20. The self-tapping threads 18 have a spiral formation 40 in a direction opposite of the knurled region spiral 34. In the illustrated fastener 10, the self-tapping threads 18 have a right-hand thread formation which is a standard thread formation direction for fasteners. The self-tapping threads 18 have a major diameter $D_{18}$ that is less than the knurled region major diameter $D_{16}$. It will be appreciated by those skilled in the art that the knurled region major diameter $D_{16}$ is greater than the diameter $D_{14}$ of the shank 14.

The self-drilling tip or point 20 is, for example, a TEKS® brand self-tapping screw form, to facilitate penetration and installation of the IMP. In an embodiment, the fastener 10 is a bi-metal fastener, in which a first portion 42 that extends from the tip 20 and includes a portion of the threads 18 is formed from a first material, such as carbon steel and a second portion 44 of the fastener 10 that includes the remainder of the threads 18, the knurled region 16, the shank 14 and the head 12 are formed from a second material, such as a stainless steel (SS). In such a bi-metal fastener, the carbon steel portion 42 may be hardened, as by heat treating, to increase the hardness (strength) of that portion of the fastener 10 for penetrating the IMP and the underlying structure, and the second portion 44 of the fastener 10 which can be formed from stainless steel for corrosion prevention. Other suitable materials will be recognized by those skilled in the art. It will also be appreciated that where the fastener is used with wood frame construction, the self-drilling tip or point 20 can be of a conventional wood screw form. Other self-drilling screw forms will be recognized by those skilled in the art.

In one embodiment, the fastener 10 is a #12-14×2½" TEKS®/2 bi-metal fastener in which the first portion 42 is approximately 0.60 inches, from the tip 20 to the thread portion 18 is a heat treated carbon steel and the second portion 44 is formed from 304 SS. The threads 18 have a major diameter $D_{18}$ of about 0.213 inches.

The knurled region 16 has a plurality of spiral knurls 36 formed therein. In an embodiment, the fastener 10 has six knurls 36A-36F on a 2 inch spiral. The knurled region 16 has a major diameter $D_{14}$ measured across opposing peaks of the knurls, e.g., 36A-36C, of about 0.25 to 0.26 inches and a minor diameter $D_{16m}$ of about 0.190 inches, and extends a distance $d_{16}$ of about 0.35 inches from the threads 18. It will be appreciated that the knurled region 16 also defines a major circumference $C_{16}$ as measure around the peaks of the knurls 36A-34F. As noted above, because the knurled region 16 has a greater major diameter $D_{16}$ (and a greater major circumference $C_{16}$) than the threaded region 18, a step 46 is formed at the juncture of the threads 18 to the knurled region 16. As will also be appreciated from the figures, that the knurls 36 have a spiral direction that is opposite to that of the threads 18. That is, the threads 18 have a right-hand twist, whereas the knurls 36 have a left-hand twist. In the event that the threads 18 have a left-hand twist, then the knurls 36 will have a right-hand twist.

The shank 14, which is adjacent the knurled region 16 has a diameter of about 0.225 inches. Also as noted above, although the shank 14 is illustrated as plain (e.g., unthreaded), it can be formed with threads if desired. In an embodiment, the shank 14, from the knurled region 16 to and including the transition 32 (at the head 12), has a length $l_{14}$ of about 0.75 inches. As noted above, the transition 32 is formed having a taper angle α of about 15 degrees. The diameter $D_{32}$ of the transition 32 at the shank 14 is the same as the shank 14, or about 0.225 inches and increases to about 0.25 inches at the juncture with the head 12. The head 12 has a diameter $D_{12}$ of about 0.60 to about 0.62 inches and a thickness $t_{12}$ of about 0.092 inches.

In an embodiment, the fastener 10 is coated. The coating can be a corrosion resistant coating and/or an ease of drive coating. It has also been found that the larger diameter of the knurled region 16 prevents abrasion of the coating and thus protects the coating when driving the fastener.

In use, the fastener 10 is positioned on the outer metal surface O of the panel IMP to be installed. Because the fastener 10 is fabricated with the self-tapping point 20, no predrilling is needed. The fastener 10 is driven into the panel IMP. The fastener 10 may be used with a washer or seal W, such as the rubber washer illustrated in FIG. 3, in which case the washer or seal W may be predrilled or may have a preformed opening (as in the case of a washer).

As the fastener 10 is driven into the panel IMP, it penetrates the outer metal surface O, the insulation I, the inner metal surface M and is driven into the underlying substrate S. It has been found that the opposite-hand twist of the knurls 36 provides a number of advantages over straight or similar-hand twist of the threads. As the fastener 10 is driven into panel IMP, metal shavings from the outer O or inner I panel could be forced up as they ride along the rotating fastener 10. The shavings can come to and out of the top of the panel outer surface S. This can result in the washer or seal W being damaged from cutting or other contact with the shavings, resulting in compromised weather resistance.

The opposite-hand twist of the knurls 36 drives the shavings downward, into the panel IMP (e.g., into the insulation I) or toward the inner surface I and substrate S. This reduces the potential for metal shavings to exit through and out the panel outer surface O. Reduced external shavings also prevent the deposition of materials that might otherwise be subject to accelerated corrosion, which could further compromise the integrity of the panel IMP.

It has also been found that the opposite-hand twist of the knurled region 16 pushes the outer panel surface O downward or into the panel IMP as the fastener s driven into the panel IMP. This prevents the outer panel surface O from separating from the insulation layer I.

Figure 3:
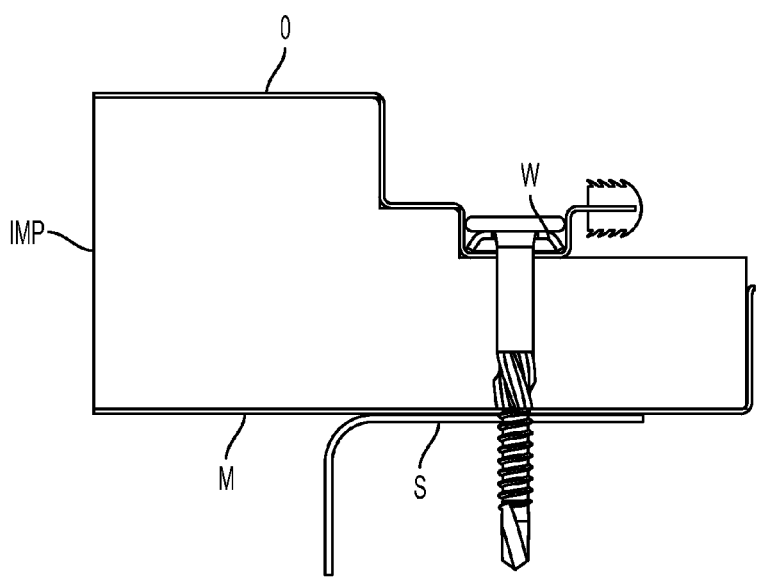
FIG. 3 illustrates the fastener in an exemplary IMP wall installation.

In addition, the step 46 that is formed at the juncture of the threads 18 and the knurled region 16 functions as a stop to prevent over-driving the fastener 10. As illustrated in FIG. 3, as the threads 18 penetrate into and through the substrate S, the knurls 36, which have a larger diameter $D_{16}$ than the threads $D_{18}$, the fastener 10 stops at the inner surface M or at the substrate S, thus preventing over-driving the fastener 10. Contact of the step 46 with the inner surface M or substrate S reduces the potential for the IMP thickness to be reduced (as by over-driving the fastener) which could otherwise impact the insulating ability of the IMP.

Although specific dimensions, materials, directions and the like are disclosed, those skilled in the art will recognize and appreciate that dimensions, materials, directions and the like other than those disclosed are within the scope and spirit of the present disclosure and appended claims.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

The invention claimed is:

1. A self-drilling, self-cleaning fastener comprising:
   a head having a top side and an underside, the head having diameter;
   a shank depending from an underside of the head, the shank having a diameter less than the diameter of the head;
   a knurled region adjacent the shank, the knurled region having a diameter, the knurled region having a plurality or spiral formed knurls therein having a twist in a first direction, the knurled region having a major circumference as measured around peaks of the knurls;
   a threaded region adjacent the knurled region, the threaded region having a diameter less than the diameter of the knurled region, the threaded region having a thread formed therein having a twist in a second direction opposite the first direction; and
   a self-drilling driving point at an end opposite the head,
   wherein a first portion of the fastener from the driving point to a location along the threads is formed from a first material and wherein a second portion of the fastener from an end of the first portion to the head is formed from a second material.

2. The fastener of claim 1 wherein the first portion material is a hardened material.

3. The fastener of claim 2 wherein the second portion material is a corrosion resistant material.

4. The fastener of claim 3 wherein the first portion material is carbon steel and the second portion material is stainless steel.

5. The fastener of claim 1 including a coating on the fastener.

6. The fastener of claim 5 wherein the coating is one or both of a corrosion resistant material and an ease of driving material.

7. The fastener of claim 1 including a coating on the fastener, wherein the coating is one or both of a corrosion resistant material and an ease of driving material.

8. The fastener of claim 1 including a transition at a juncture of the shank and the head, the transition having a taper that widens from the shank to the head.

* * * * *